United States Patent
Baba

(10) Patent No.: US 10,697,481 B2
(45) Date of Patent: Jun. 30, 2020

(54) WIND TURBINE, CONTROL DEVICE FOR SAME, AND CONTROL METHOD FOR SAME

(71) Applicant: MITSUBISHI HEAVY INDUSTRIES, LTD., Tokyo (JP)

(72) Inventor: Mitsuya Baba, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 323 days.

(21) Appl. No.: 15/746,223

(22) PCT Filed: Feb. 29, 2016

(86) PCT No.: PCT/JP2016/056068
§ 371 (c)(1),
(2) Date: Jan. 19, 2018

(87) PCT Pub. No.: WO2017/149605
PCT Pub. Date: Sep. 8, 2017

(65) Prior Publication Data
US 2018/0216638 A1 Aug. 2, 2018

(51) Int. Cl.
*F03D 7/02* (2006.01)
*F15B 21/042* (2019.01)
(Continued)

(52) U.S. Cl.
CPC ............ *F15B 21/042* (2013.01); *F03D 7/024* (2013.01); *F03D 7/026* (2013.01); *F03D 7/0224* (2013.01); *F03D 7/04* (2013.01); *F15B 1/26* (2013.01); *F15B 11/20* (2013.01); *F15B 19/00* (2013.01); *F05B 2260/85* (2013.01); *F05B 2270/303* (2013.01); *F05B 2270/605* (2013.01);
(Continued)

(58) Field of Classification Search
CPC ........ F03D 7/0224; F03D 7/024; F03D 7/026; F03D 7/04; F15B 21/042; F15B 1/26; F15B 11/20; F15B 19/00
See application file for complete search history.

(56) References Cited

U.S. PATENT DOCUMENTS 9,169,829 B2 * 10/2015 Nomaguchi ............... F03D 7/02
2011/0012353 A1 * 1/2011 Kamata .................... F03D 80/70
290/44

FOREIGN PATENT DOCUMENTS

JP H08-226373 9/1996

* cited by examiner

*Primary Examiner* — J. Todd Newton
*Assistant Examiner* — Sabbir Hasan
(74) *Attorney, Agent, or Firm* — Manabu Kanesaka; Benjamin Hauptman; Kenneth Berner

(57) ABSTRACT

A wind turbine includes a plurality of wind turbine blades; a plurality of hydraulic actuators for controlling respective pitch angles of the wind turbine blades; a first tank storing control oil for the hydraulic actuators; a first hydraulic pump disposed between the plurality of hydraulic actuators and the first tank, for pumping the control oil; a plurality of valves each of which is provided for corresponding one of the hydraulic actuators, for controlling a supply state of the control oil to the hydraulic actuator; and a control part for controlling each of the valves. The control part is configured to, in warm-up of a pitch hydraulic system of the plurality of wind turbine blades, perform an oil transfer operation of changing the pitch angle of the wind turbine blade from a feather side toward a fine side and then returning the pitch angle to the feather side.

15 Claims, 5 Drawing Sheets

(51) Int. Cl.
*F03D 7/04* (2006.01)
*F15B 1/26* (2006.01)
*F15B 11/20* (2006.01)
*F15B 19/00* (2006.01)

(52) U.S. Cl.
CPC ....... *F15B 2211/857* (2013.01); *Y02E 10/721* (2013.01); *Y02E 10/722* (2013.01); *Y02E 10/723* (2013.01)

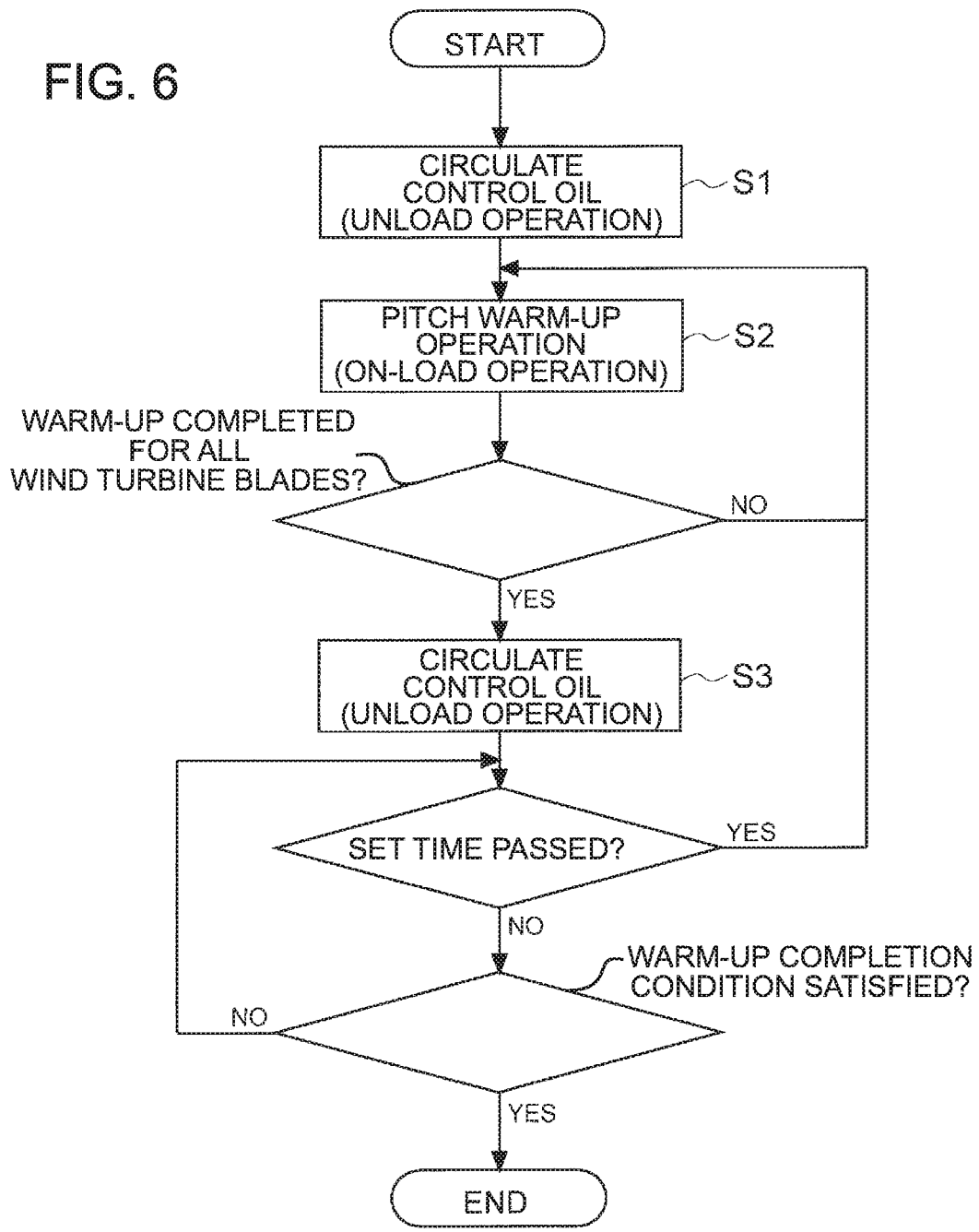

WIND TURBINE, CONTROL DEVICE FOR SAME, AND CONTROL METHOD FOR SAME

TECHNICAL FIELD

The present disclosure relates to a wind turbine, a control device for the same, and a control method for the same.

BACKGROUND ART

A typically known wind turbine is provided with wind turbine blades supported rotatably with respect to a hub via a rotational bearing such that the pitch angle of the wind turbine blades is variable, and a hydraulic actuator for rotating the wind turbine blades about the center axis of the rotational bearing.

For instance, Patent Document 1 discloses a variable pitch blade type wind turbine configured to vary the pitch angle of wind turbine blades with a hydraulic cylinder via a link.

CITATION LIST

Patent Literature

Patent Document 1: JPH8-226373A

SUMMARY

Problems to be Solved

Meanwhile, warm-up is required when starting a pitch drive device for wind turbine blades including a hydraulic actuator under a low ambient temperature.

Patent Document 1 does not disclose a configuration for warming up a pitch drive device provided with a hydraulic cylinder.

An object of at least some embodiments of the present invention is to provide a wind turbine capable of appropriately performing warm-up of a pitch drive device, a control device of the same, and a control method for the same.

Solution to the Problems (1) A wind turbine according to at least some embodiments of the present invention comprises: a plurality of wind turbine blades; a plurality of hydraulic actuators for controlling respective pitch angles of the plurality of wind turbine blades; a first tank storing control oil for the plurality of hydraulic actuators; a first hydraulic pump disposed between the plurality of hydraulic actuators and the first tank, for pumping the control oil; a plurality of valves each of which is provided for corresponding one of the hydraulic actuators, for controlling a supply state of the control oil to the hydraulic actuator; and a control part for controlling each of the valves. The control part is configured to, in warm-up of a pitch hydraulic system of the plurality of wind turbine blades, for each of the wind turbine blades in turn, control the valve corresponding to the wind turbine blade so as to make the hydraulic actuator corresponding to the wind turbine blade perform an oil transfer operation of changing the pitch angle of the wind turbine blade from a feather side toward a fine side and then returning the pitch angle to the feather side.

With the above configuration (1), the hydraulic actuators perform the oil transfer operation for the plurality of wind turbine blades, and control oil is moved through the pitch hydraulic system of each of the wind turbine blades, and thereby it is possible to equalize the oil temperature of control oil, and perform warm-up of the pitch hydraulic system appropriately. Furthermore, the oil transfer operation is performed for the plurality of wind turbine blades in turn, and thus it is possible to reduce aerodynamic torque that is generated in the wind turbine rotor during warm-up of the pitch hydraulic system, and thus to suppress unintended rotation of the wind turbine rotor.

(2) In some embodiments, in the above configuration (1), the control part is configured to control the plurality of valves so as to make an i-th hydraulic actuator, among the plurality of hydraulic actuators, perform the oil transfer operation for an i-th wind turbine blade, among the plurality of wind turbine blades (where i=1 to N−1 and N is the total number of the wind turbine blades), and then make an (i+1)-th hydraulic actuator, among the plurality of hydraulic actuators, perform the oil transfer operation for an (i+1)-th wind turbine blade, among the plurality of wind turbine blades.

With the above configuration (2), the oil transfer operation is performed for the (i+1)-th wind turbine blade after completion of the oil transfer operation for the i-th wind turbine blade, and thus it is possible to reliably reduce aerodynamic torque that is generated in the wind turbine rotor during warm-up of the pitch hydraulic system.

(3) In some embodiments, in the above configuration (1) or (2), the valves include: a proportional control valve disposed between each of the hydraulic actuators and the first hydraulic pump; and an emergency solenoid valve disposed between each of the hydraulic actuators and the first tank. The control part is configured to, when making the hydraulic actuator of each of the wind turbine blades perform the oil transfer operation, control the proportional control valve to open so as to change the pitch angle from the feather side toward the fine side, and then control the emergency solenoid valve to open so as to return the pitch angle from the fine side toward the feather side.

In the above configuration (3), in the oil transfer operation for each of the wind turbine blades, control oil flows through the hydraulic line including the proportional control valve, of the pitch hydraulic system, when moving the pitch angle to the fine side, and the control oil flows through the hydraulic line including the emergency solenoid valve, of the pitch hydraulic system, when the pitch angle is moved to the feather side. Accordingly, control oil flows through the hydraulic line in a broad range of the pitch hydraulic system, which makes it possible to equalize the oil temperature of control oil in the pitch hydraulic system effectively, and to perform warm-up of the pitch hydraulic system appropriately.

(4) In some embodiments, in any one of the above configurations (1) to (3), the wind turbine further comprises a bypass line having an end connected between the first hydraulic pump and the hydraulic actuators, for returning the control oil from the first hydraulic pump to the first tank; and a bypass valve disposed in the bypass line. The control part is configured to: if a temperature of the control oil in the first tank is lower than a first threshold, open the bypass valve to make the first hydraulic pump circulate the control oil in the first tank through a circulation flow passage including the bypass line, to achieve an unload state in which the control oil is not supplied to the hydraulic actuators; and if the temperature of the control oil inside the first tank is not lower than the first threshold, close the bypass valve to achieve an on-load state in which the control oil is suppliable to the actuators.

With the above configuration (4), the state of the pitch hydraulic system is switched between the unload state and the on-load state in response to the temperature of control oil inside the first tank, through the opening-closing control of the bypass valve. Thus, it is possible to perform warm-up of the pitch hydraulic system efficiently.

Specifically, if the temperature of control oil inside the first tank is lower than the first threshold, the state of the pitch hydraulic system is switched to the unload state, and control oil is circulated in the circulation flow passage including the bypass line to increase the temperature of control oil inside the first tank. Furthermore, if the temperature of control oil inside the first tank is not lower than the threshold, it is possible to equalize the oil temperature of control oil in the pitch hydraulic system, by supplying control oil having a relatively high temperature inside the first tank to most part of the pitch hydraulic system including the hydraulic actuator.

(5) In some embodiments, in the above configuration (4), the wind turbine further comprises a first heater for heating the control oil in the first tank. The control part is configured to, if the first hydraulic pump is stopped at start of warm-up of the pitch hydraulic system and the temperature of the control oil in the first tank is not higher than a predetermined temperature which is lower than the first threshold, control the first heater to heat the control oil in the first tank while the first hydraulic pump is maintained to be stopped.

With the above configuration (5), if the first hydraulic pump is stopped at the start of warm-up of the pitch hydraulic system and the temperature of control oil inside the first tank is not higher than a predetermined temperature, the first heater increases the temperature of control oil in the first tank while maintaining the first hydraulic pump to be stopped. Accordingly, in a case where the viscosity or behavior of control oil is not in an assumed range due to a low temperature, for instance, the first heater increases the temperature of the control oil instead of immediately operating the first hydraulic pump, which makes it possible to prevent damage to the first hydraulic pump.

(6) In some embodiments, in any one of the above configurations (1) to (5), the wind turbine further comprises a bypass line having an end connected between the first hydraulic pump and the hydraulic actuators, for returning the control oil from the first hydraulic pump to the first tank; and a bypass valve disposed in the bypass line. The control part is configured to: if an ambient temperature is lower than a lower limit of an operable temperature range of the wind turbine continuously for a predetermined period, control the valves to stop operation of the wind turbine and change the pitch angle of each of the wind turbine blades to the feather side; make the wind turbine stand by in an unload state in which the bypass valve is open, until a warm-up starting condition such that the ambient temperature is not lower than a warm-up starting temperature of the wind turbine continuously for a predetermined period is satisfied; and after the warm-up starting condition is satisfied, perform warm-up of each part of the wind turbine including the pitch hydraulic system.

With the above configuration (6), the wind turbine stands by in an unload state in which the bypass valve is open until the warm-up starting condition is satisfied, and thus it is possible to circulate control oil in the circulation flow passage including the bypass line to suppress temperature reduction of control oil inside the first tank. Accordingly, after the warm-up starting condition is satisfied, it is possible to perform warm-up of the pitch hydraulic system easily.

(7) In some embodiments, in the above configuration (6), the wind turbine further comprises a main shaft configured to rotate with a wind turbine rotor including the plurality of wind turbine blades; a main bearing supporting the main shaft rotatably; a second tank storing lubricant oil for the main bearing; a second heater for heating the lubricant oil in the second tank; and a second hydraulic pump for supplying the main bearing with the lubricant oil in the second tank. The control part is configured to, after the warm-up starting condition is satisfied: if a temperature of the lubricant oil in the second tank is lower than a second threshold, control the second heater to heat the lubricant oil in the second tank; and if the temperature of the lubricant oil in the second tank reaches the second threshold, operate the second hydraulic pump intermittently.

With the above configuration (7), after the warm-up starting condition is satisfied, the second heater performs heating until the temperature of lubricant oil inside the second tank (lubricant oil for the main bearing) reaches the second threshold. Accordingly, for instance, in a case where the viscosity or behavior of lubricant oil is not within an assumed range due to a low temperature, the second heater increases the temperature of the lubricant oil instead of immediately operating the second hydraulic pump, which makes it possible to prevent damage to the second hydraulic pump, and suppress leakage of lubricant oil due to clogging of the return pipe with high-viscosity oil from the main bearing. Furthermore, after the temperature of lubricant oil inside the second tank reaches the second threshold, the second hydraulic pump is operated intermittently (inching operation), and thus it is possible to suppress leakage of high-viscosity lubricant oil from the main bearing. Accordingly, it is possible to perform warm-up of the lubricant oil system of the main shaft appropriately.

(8) In some embodiments, in the above configuration (6) or (7), the wind turbine further comprises a speed increasing unit for increasing a rotation speed of a wind turbine rotor including the plurality of wind turbine blades; a third hydraulic pump for circulating lubricant oil stored in a tank part disposed inside the speed increasing unit, via a circulation pipe connected to the tank part; and a third heater for heating the lubricant oil in the tank part or the circulation pipe. The control part is configured to, after the warm-up starting condition is satisfied, control the third heater to heat the lubricant oil in the tank part or the circulation pipe for a predetermined time.

With the above configuration (8), after the warm-up starting condition is satisfied, the third heater increases the temperature of lubricant oil (lubricant oil for speed increasing unit) inside the tank part or the circulation pipe, and thereby it is possible to perform warm-up of the lubricant oil system of the speed increasing unit appropriately.

(9) In some embodiments, in any one of the above configurations (6) to (8), the wind turbine comprises a main shaft configured to rotate with a wind turbine rotor including the plurality of wind turbine blades; a main bearing supporting the main shaft rotatably; a second tank storing lubricant oil for the main bearing; a second hydraulic pump for supplying the main bearing with the lubricant oil in the second tank; a speed increasing unit for increasing a rotation speed of the wind turbine rotor; and a third hydraulic pump for circulating lubricant oil stored in a tank part disposed inside the speed increasing unit, via a circulation pipe connected to the tank part. The control part is configured to, in warm-up of each part of the wind turbine, continue operation of the pump which is in operation when the warm-up starting condition is satisfied, from among the first hydraulic pump, the second hydraulic pump, and the third hydraulic pump.

With the above configuration (9), in warm-up of each part of the wind turbine, operation of the pump which is in operation when the warm-up starting condition is satisfied is continued without a break, and thus warm-up can be performed immediately.

(10) In some embodiments, in any one of the above configurations (6) to (9), the wind turbine further comprises a nacelle rotatably supporting a wind turbine rotor including the plurality of wind turbine blades; and a yaw drive part for rotating the nacelle. The control part is configured to: control, during operation of the wind turbine, the yaw drive part to make the nacelle rotate in a wind direction; and control, during standby of the wind turbine in the unload state, the yaw drive part not to make the nacelle rotate in the wind direction.

With the above configuration (10), the yaw drive part makes the nacelle follow wind direction during operation of the wind turbine to improve the operation efficiency of the wind turbine, and the yaw drive part does not make the nacelle rotate in the wind direction during standby of the wind turbine in the unload state. Thus, it is possible to save energy.

(11) A control device according to at least some embodiments of the present invention, for the wind turbine according to any one of the above (1) to (10), is configured to control, in warm-up of a pitch hydraulic system of a plurality of wind turbine blades of the wind turbine, for each of the wind turbine blades in turn, control the valve corresponding to the wind turbine blade so as to make the hydraulic actuator corresponding to the wind turbine blade perform an oil transfer operation of changing the pitch angle of the wind turbine blade from a feather side toward a fine side and then returning the pitch angle to the feather side.

With the above configuration (11), the hydraulic actuators perform the oil transfer operation for the plurality of wind turbine blades, and control oil is moved through the pitch hydraulic system of each of the wind turbine blades, and thereby it is possible to equalize the oil temperature of control oil, and perform warm-up of the pitch hydraulic system appropriately. Furthermore, the oil transfer operation is performed for the plurality of wind turbine blades in turn, and thus it is possible to reduce aerodynamic torque that is generated in the wind turbine rotor during warm-up of the pitch hydraulic system, and thus to suppress unintended rotation of the wind turbine rotor.

(12) A method of controlling a wind turbine according to at least some embodiments of the present invention, is for a wind turbine which comprises: a plurality of wind turbine blades; a plurality of hydraulic actuators for controlling respective pitch angles of the plurality of wind turbine blades; a first tank storing control oil for the plurality of hydraulic actuators; a first hydraulic pump disposed between the plurality of hydraulic actuators and the first tank, for pumping the control oil; and a plurality of valves each of which is provided for corresponding one of the plurality of hydraulic actuators, for controlling a supply state of the control oil to the hydraulic actuator. The method comprises a step of, in warm-up of a pitch hydraulic system of the plurality of wind turbine blades, for each of the wind turbine blades in turn, controlling the valve corresponding to the wind turbine blade so as to make the hydraulic actuator corresponding to the wind turbine blade perform an oil transfer operation of changing the pitch angle of the wind turbine blade from a feather side toward a fine side and then returning the pitch angle to the feather side.

According to the above method (12), the hydraulic actuators perform the oil transfer operation for the plurality of wind turbine blades, and control oil is moved through the pitch hydraulic system of each of the wind turbine blades, and thereby it is possible to equalize the oil temperature of control oil, and perform warm-up of the pitch hydraulic system appropriately. Furthermore, the oil transfer operation is performed for the plurality of wind turbine blades in turn, and thus it is possible to reduce aerodynamic torque that is generated in the wind turbine rotor during warm-up of the pitch hydraulic system, and thus to suppress unintended rotation of the wind turbine rotor.

(13) In some embodiments, in the above method (12), the step of controlling the valve includes controlling the plurality of valves so as to make an i-th hydraulic actuator, among the plurality of hydraulic actuators, perform the oil transfer operation for an i-th wind turbine blade, among the plurality of wind turbine blades (where i=1 to N−1 and N is the total number of the wind turbine blades), and then make an (i+1)-th hydraulic actuator, among the plurality of hydraulic actuators, perform the oil transfer operation for an (i+1)-th wind turbine blade, among the plurality of wind turbine blades.

According to the above method (13), the oil transfer operation is performed for the (i+1)-th wind turbine blade after completion of the oil transfer operation for the i-th wind turbine blade, and thus it is possible to reliably reduce aerodynamic torque that is generated in the wind turbine rotor during warm-up of the pitch hydraulic system.

(14) In some embodiments, in the above method (12) or (13), the valves include: a proportional control valve disposed between each of the hydraulic actuators and the first hydraulic pump; and an emergency solenoid valve disposed between each of the hydraulic actuators and the first tank. The step of controlling the valve includes, when making the hydraulic actuator of each of the wind turbine blades perform the oil transfer operation, controlling the proportional control valve to open so as to change the pitch angle from the feather side to the fine side, and then controlling the emergency solenoid valve to open so as to return the pitch angle from the fine side to the feather side.

According to the above method (14), in the oil transfer operation for each of the wind turbine blades, control oil flows through the hydraulic line including the proportional control valve, of the pitch hydraulic system, when moving the pitch angle to the fine side, and the control oil flows through the hydraulic line including the emergency solenoid valve, of the pitch hydraulic system, when the pitch angle is moved to the feather side. Accordingly, control oil flows through the hydraulic line in a broad range of the pitch hydraulic system, which makes it possible to equalize the oil temperature of control oil in the pitch hydraulic system effectively, and to perform warm-up of the pitch hydraulic system appropriately.

(15) In some embodiments, in any one of the above methods (12) to (14), the wind turbine comprises: a bypass line having an end connected between the first hydraulic pump and the hydraulic actuators, for returning the control oil from the first hydraulic pump to the first tank; and a bypass valve disposed in the bypass line. The method further comprises: a step of, if an ambient temperature is not higher than a lower limit of an operable temperature range of the wind turbine continuously for a predetermined period, controlling the valves to stop operation of the wind turbine and change the pitch angle of each of the wind turbine blades to the feather side; a step of making the wind turbine stand by in an unload state in which the bypass valve is open, until a warm-up starting condition such that the ambient temperature is not lower than a warm-up starting temperature of the wind turbine continuously for a predetermined period is satisfied; and a step of, after the warm-up starting condition is satisfied, performing warm-up of each part of the wind turbine including the pitch hydraulic system.

According to the above method (15), the wind turbine stands by in an unload state in which the bypass valve is open until the warm-up starting condition is satisfied, and thus it is possible to circulate control oil in the circulation flow passage including the bypass line to suppress temperature reduction of control oil inside the first tank. Accordingly, after the warm-up starting condition is satisfied, it is possible to perform warm-up of the pitch hydraulic system easily.

Advantageous Effects

According to at least some embodiments of the present invention, the hydraulic actuators perform the oil transfer operation for the plurality of wind turbine blades, and control oil is moved through the pitch hydraulic system of each of the wind turbine blades, and thereby it is possible to equalize the oil temperature of control oil, and perform warm-up of the pitch hydraulic system appropriately. Furthermore, the oil transfer operation is performed for the plurality of wind turbine blades in turn, and thus it is possible to reduce aerodynamic torque that is generated in the wind turbine rotor during warm-up of the pitch hydraulic system, and thus to suppress unintended rotation of the wind turbine rotor.

BRIEF DESCRIPTION OF DRAWINGS

FIG. 6 is a flowchart of warm-up operation of a wind turbine according to an embodiment.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

Figure 1:
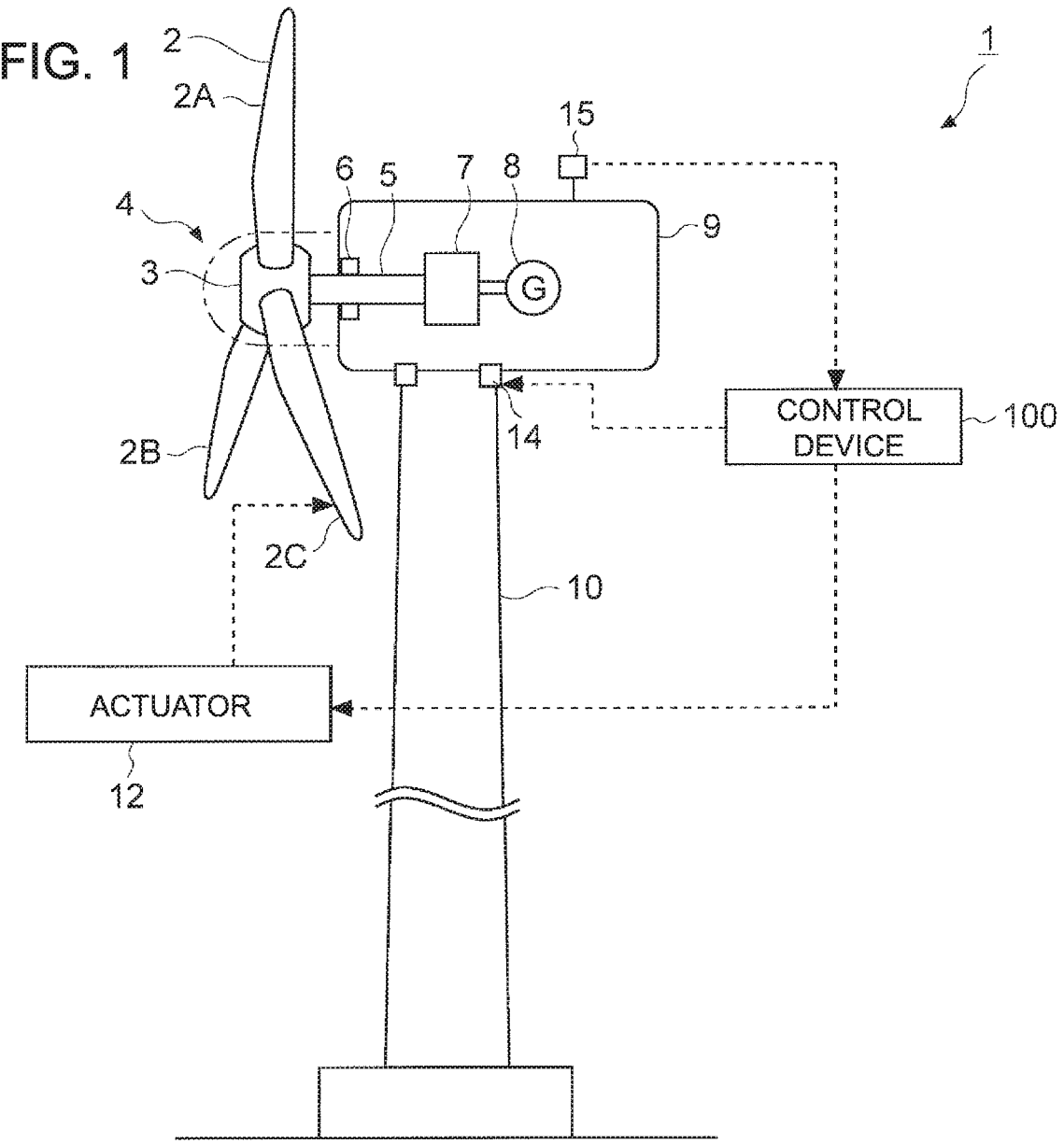
FIG. 1 is a schematic overall configuration diagram of a wind turbine according to an embodiment.

First, with reference to FIG. 1, a wind turbine 1 according to some embodiments will be described. FIG. 1 is a schematic overall configuration diagram of the wind turbine 1 according to an embodiment.

The wind turbine 1 according to some embodiments includes a wind turbine rotor 4 including a plurality of wind turbine blades 2 (2A to 2C) and a hub 3 with the wind turbine blades 2 mounted thereto, a nacelle 9 supporting the wind turbine rotor 4 rotatably, and a tower 10 having an upper end supporting the nacelle 9.

Furthermore, the wind turbine 1 includes a hydraulic actuator 12 for controlling the pitch angle of the wind turbine blades 2. During warm-up of the wind turbine 1, the hydraulic actuator 12 is controlled by a control device 100 described below.

Furthermore, the wind turbine 1 may include a yaw drive part 14 for rotating the nacelle 9. Moreover, the wind turbine 1 may include a temperature sensor 15 for measuring the ambient temperature.

For instance, in an embodiment shown in FIG. 1, the wind turbine 1 is a wind turbine power generating apparatus provided with a generator 8.

The wind turbine 1 includes three wind turbine blades 2A to 2C mounted to the hub 3 in a radial fashion. However, the number and configuration of the wind turbine blades 2 are not limited to this.

The hub 3 is coupled to the main shaft 5.

The main shaft 5 is rotatably supported by a main bearing 6 mounted to the nacelle 9.

As the plurality of wind turbine blades 2 receive wind, the wind turbine rotor 4 including the wind turbine blades 2 and the hub 3 rotates with the main shaft 5.

The wind turbine rotor 4 is coupled to a speed increasing unit 7 via the main shaft 5. The speed increasing unit 7 is connected to the generator 8. Accordingly, the rotation speed of the wind turbine rotor 4 is increased by the speed increasing unit 7, and the rotation is input to the generator 8. While the speed increasing unit 7 (e.g. gear type speed increasing unit) is shown in FIG. 1 is an example of a power transmission mechanism for transmitting rotational energy of the wind turbine rotor 4 to the generator 8, the power transmission mechanism is not limited to this. For instance, a power transmission mechanism of another type may be used, such as a direct drive connecting the wind turbine rotor 4 to the generator 8 directly via the main shaft 5, and a hydraulic transmission including a hydraulic pump and a hydraulic motor.

The nacelle 9 is supported on the upper end of the tower 10 so as to be rotatable in the yaw direction. The tower 10 may be disposed on land, or on water such as ocean and lake.

In the wind turbine 1 described above, as shown in FIG. 2 for instance, the wind turbine state changes with environmental conditions including the ambient temperature. Herein, FIG. 2 is a diagram showing an example of transition of the wind turbine state with respect to the ambient temperature.

In the following description, the same component is indicated by the same reference numeral shown in FIG. 1 where appropriate.

Figure 2:
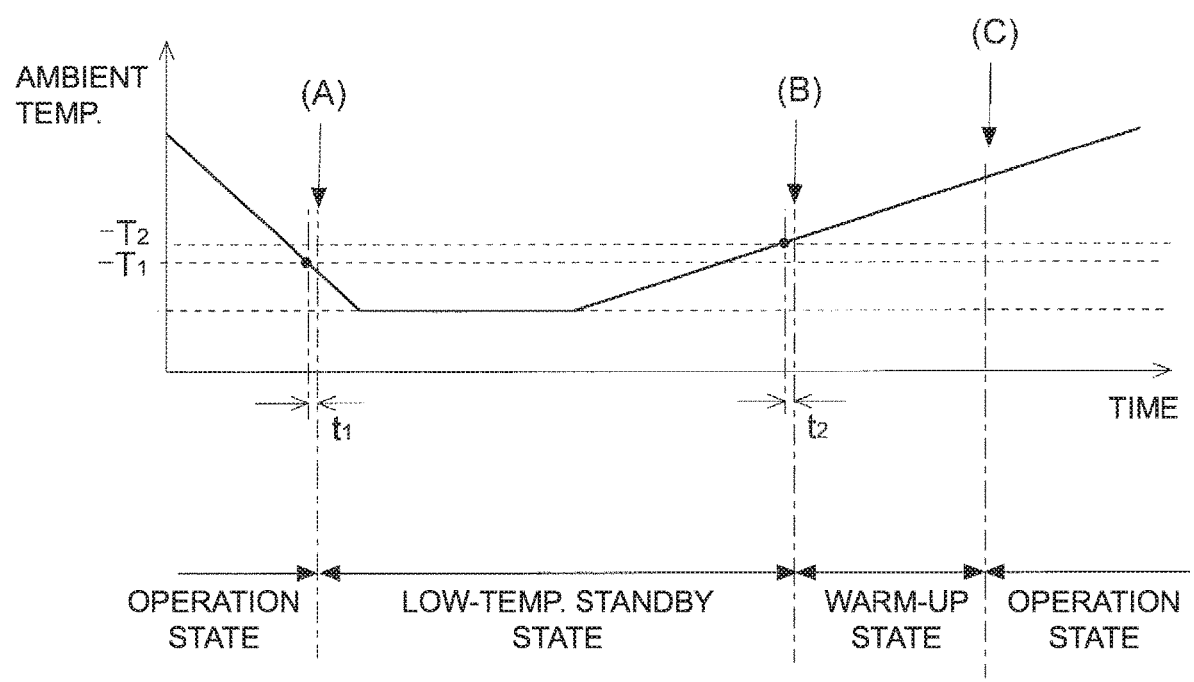
FIG. 2 is a diagram showing an example of transition of wind turbine state with respect to ambient temperature.

In the embodiment shown in FIG. 2, the wind turbine 1 is configured to transition between a plurality of wind turbine states including an operation state, a low-temperature standby state, and a warm-up state.

In the operation state, the wind turbine 1 performs power generation through normal operation.

In the operation state, the yaw drive part 14 may be set to perform an automatic following control of adjusting orientation of the wind turbine rotor 4 in response to wind direction.

In the operation state, if the ambient temperature satisfies a low-temperature shutdown condition (A), the wind turbine 1 stops power generation and transitions to the low-temperature standby state. For instance, the low-temperature shutdown condition (A) is "when the ambient temperature is lower than a low-temperature standby starting temperature $-T°_1 C$ continuously for a predetermined period t1". The low-temperature standby starting temperature $-T_1°$ C. may be a lower limit of an operable temperature range of the wind turbine 1.

An object of the low-temperature standby state is to protect the devices of the wind turbine 1 under a low temperature state. In the low-temperature standby state, the wind turbine 1 stands by while operating auxiliary devices such as at least a part of heaters (e.g. the second heater 62 of the main bearing 6 and the third heater 72 of the speed increasing unit 7 shown in FIG. 5) and a pump (e.g. the first hydraulic pump 23 for control oil shown in FIG. 3).

In the low-temperature standby state, the pitch angle of the wind turbine blades 2 may be changed to the feather side. Furthermore, the automatic following control by the yaw drive part 14 may be stopped.

In the low-temperature standby state, if the ambient temperature satisfies a warm-up starting condition (B), the wind turbine 1 transitions to the warm-up state while the power generation is maintained to be stopped. For instance, the warm-upstarting condition (B) is "when the ambient temperature is not lower than a warm-up starting temperature $-T_2°$ C. continuously for a predetermined period t2". The warm-up starting temperature $-T_2°$ C. is a temperature higher than the low-temperature standby starting temperature $-T_1°$ C.

A main object of the warm-up state is to warm-up the devices (e.g. lubricant oil of the devices) before starting operation of the wind turbine 1. In the warm-up state, warm-up operation of each device is performed so as to enable start-up of the wind turbine 1.

In the warm-up state, the yaw drive part 14 may be set to perform the automatic following control when needed. Nevertheless, during warm-up operation of the hydraulic actuator 12 for controlling the pitch angle, the yaw drive part 14 may be set not to perform the automatic following control, so as to avoid generation of torque in the main shaft 5.

In the warm-up state, if the ambient temperature satisfies a warm-up completing condition (C), the wind turbine 1 transitions to the operation state. For instance, the warm-up completing condition (C) is when warm-up of all of the devices is completed.

The operation state herein includes a standby state of awaiting for wind before start-up of the wind turbine 1, and a start-up state of starting up.

Next, with reference to FIGS. 3 to 6, the warm-up operation of the wind turbine 1 will be described in detail. The warm-up operation of the wind turbine 1 is operation in the above described warm-up state, for instance.

Figure 3:
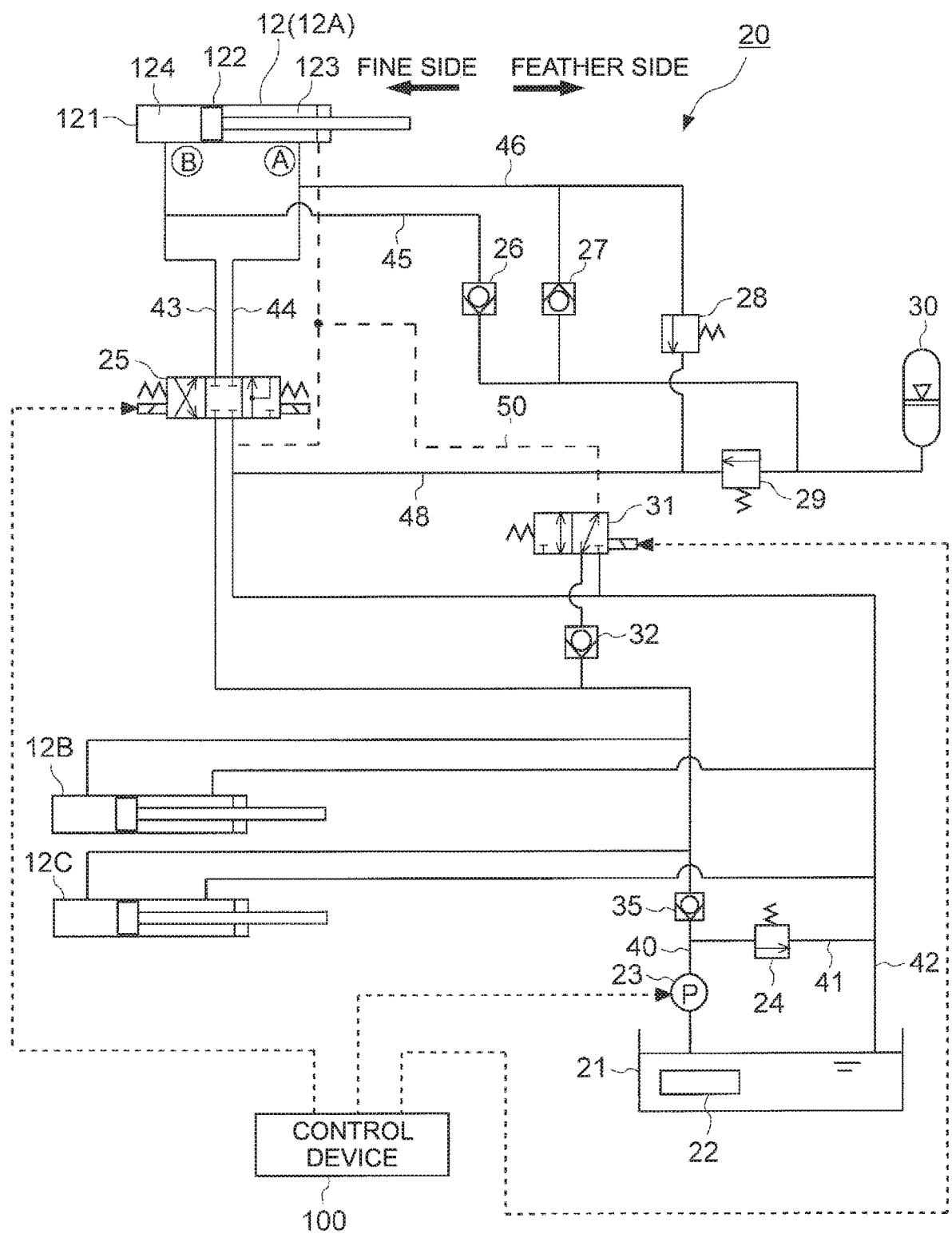
FIG. 3 is a configuration diagram showing a pitch hydraulic system of a wind turbine according to an embodiment.

FIG. 3 is a configuration diagram showing the pitch hydraulic system 20 of the wind turbine 1 according to an embodiment.

As shown in FIG. 3 for example, the wind turbine 1 according to some embodiments includes a plurality of hydraulic actuators 12A to 12C for controlling the pitch angles of the plurality of wind turbine blades 2A to 2C (FIG. 1), respectively. For instance, the hydraulic actuators 12A to 12C are mounted inside the hub 3, each including a hydraulic cylinder 121 and a cylinder rod 122 configured to reciprocate inside the hydraulic cylinder 121. In the example shown in FIG. 3, when control oil is supplied to a fine-side hydraulic chamber 123 of the hydraulic cylinder 121 from a fine-side port A, the cylinder rod 122 moves to the left side in the drawing, and thereby the wind turbine blade 2 reaches a full fine angle. Furthermore, when control oil is supplied to a feather-side hydraulic chamber 124 of the hydraulic cylinder 121 from a feather-side port B, the cylinder rod 122 moves to the right side in the drawing, and the wind turbine blade 2 reaches a full feather angle.

Furthermore, the wind turbine 1 includes a pitch hydraulic system 20 for operating each of the hydraulic actuators 12A to 12C.

Further, in FIG. 1, only the hydraulic system for operating the hydraulic actuator 12A is extracted to be shown in the drawing, and the hydraulic system for other hydraulic actuators 12B, 12C is not shown. However, the other hydraulic actuators 12B, 12C may also have a configuration similar to that of the hydraulic actuator 12A. Furthermore, in FIG. 1, the solid line represents a control oil line, and the dotted line represents a pilot oil line.

The pitch hydraulic system 20 includes a first tank 21 storing the control oil, a first hydraulic pump 23 disposed between the hydraulic actuators 12A to 12C and the first tank 21, and a plurality of valves for controlling the supply state of the control oil to the hydraulic actuators 12A to 12C.

The first tank 21 stores control oil for the plurality of hydraulic actuators 12A to 12C. Inside the first tank 21, the first heater 22 for heating the control oil may be provided.

The first hydraulic pump 23 is disposed between the plurality of hydraulic actuators 12A to 12C and the first tank 21, and configured to pump the control oil.

The plurality of valves are provided corresponding to the plurality of hydraulic actuators 12A to 12C, respectively, and configured to control the supply state of the control oil to the hydraulic actuators 12A to 12C.

Next, the specific configuration of the pitch hydraulic system 20 in an embodiment and the basic operation of the pitch hydraulic system 20 in normal operation (operation state) of the wind turbine 1 will be described.

The pitch hydraulic system 20 includes a control oil line (oil supply line) 40 for supplying control oil toward the hydraulic actuator 12 from the first tank 21 with the first hydraulic pump 23, a control oil line (return oil line) 42 for returning control oil to the first tank 21 from the hydraulic actuator 12, and a proportional control valve 25 disposed between the hydraulic actuator 12 and the first hydraulic pump 23.

When controlling the pitch angle of the wind turbine blade 2 to the fine side, the proportional control valve 25 connects the control oil line (supply oil line) 40 to the control oil line 44 communicating with the fine-side port A of the hydraulic cylinder 121, and also connects the control oil line 43 communicating with the feather-side port B of the hydraulic cylinder 121 to the control oil line (return oil line) 42. Accordingly, control oil fed from the first tank 21 by the first hydraulic pump 23 is supplied to the fine-side hydraulic chamber 123 of the hydraulic cylinder 121 from the fine-side port A, through the control oil lines 40, 44. Furthermore, control oil discharged from the feather-side hydraulic chamber 124 via the feather-side port B returns to the first tank 21 through the control oil lines 43, 42. Accordingly, the pitch angle of the wind turbine blade 2 is controlled to be on the fine side by the hydraulic actuator 12.

Furthermore, when controlling the pitch angle of the wind turbine blade 2 to the feather side, the proportional control valve 25 connects the control oil line (supply oil line) 40 to the control oil line 43 communicating with the feather-side port B. Accordingly, control oil fed from the first tank 21 by the first hydraulic pump 23 is supplied to the feather-side hydraulic chamber 124 from the feather-side port B through the control oil lines 40, 43, and control oil flows toward the feather-side port B from the fine-side port A through the control oil lines 44, 43.

Furthermore, the above pitch hydraulic system 20 has a circuit for controlling the pitch angle to the feather side at the time of emergency. The time of emergency includes, for instance, the time when supply of control oil to the hub 3 is cut, when the proportional control valve is broken down, or when the wind turbine 1 is stopped in emergency.

The pitch hydraulic system 20 includes an emergency solenoid valve 31 disposed between the hydraulic actuator 12 and the first tank 21, an accumulator 30 for emergency stop, and check valves 26, 27 that operate in emergency.

The emergency solenoid valve 31 is demagnetized in emergency, so as to connect the pilot oil line 50 connected to the fine-side port A to the control oil line (return oil line) 42 to discharge pilot oil from the fine-side hydraulic chamber 123. Normally, the emergency solenoid valve 31 connects the control oil line (supply oil line) 40 to the pilot oil line 50, and is configured to supply pilot oil via the check valve 32.

The check valves 26, 27 are configured to normally shut off flows in both directions, and open when the emergency solenoid valve 31 is demagnetized and pilot oil is discharged. Accordingly, in emergency, control oil flows from the accumulator 30 and the fine-side port A to the feather-side port B, and the pitch angle is controlled to the feather side. The accumulator 30 and the control oil line (return oil line) 42 are connected by the control oil line 48, and an opening-closing valve 29 is disposed in the control oil line 48. The opening-closing valve 29 is configured to discharge control oil to the control oil line (return oil line) 42 when the pressure in the control oil line on the side of the hydraulic actuator 12 including the accumulator 30 reaches a set pressure.

Next, the control device (control part) 100 for controlling the pitch angle of the wind turbine blade 2 will be described.

As shown in FIGS. 1 and 3, the control device 10 in some embodiments is mainly configured to control the plurality of valves in the above described pitch hydraulic system 20 individually, to control the pitch angle of the wind turbine blades 2 during warm-up.

Furthermore, the control device 100 is configured to, during warm-up of the pitch hydraulic system 20 of the plurality of wind turbine blades 2 (2A to 2C), for each of the plurality of wind turbine blades 2 in turn, control a valve corresponding to each of the wind turbine blades 2, such that the hydraulic actuator 12 (12A to 12C) corresponding to the wind turbine blade 2 performs oil transfer operation in which the pitch angle of the wind turbine blade 2 is moved to the fine side from the feather side and returned again to the feather side.

In this case, the control device 100 may be configured to control the plurality of valves such that the i-th hydraulic actuator 12 (where i=1 to N–i, and N is the total number of wind turbine blades 2A to 2C) performs the oil transfer operation for the i-th wind turbine blade 2 and then the (i+1)-th hydraulic actuator 12 of the wind turbine blade 2 performs the oil transfer operation for the (i+1)-th wind turbine blade 2.

With the above configuration, the hydraulic actuators 12 perform the oil transfer operation for the plurality of wind turbine blades 2, and control oil is moved through the pitch hydraulic system 20 of each of the wind turbine blades 2, and thereby it is possible to equalize the oil temperature of control oil, and perform warm-up of the pitch hydraulic system 20 appropriately. Furthermore, the oil transfer operation is performed for the plurality of wind turbine blades 2 in turn, and thus it is possible to reduce aerodynamic torque that is generated in the wind turbine rotor 4 during warm-up of the pitch hydraulic system 20, and thus to suppress unintended rotation of the wind turbine rotor 4.

Furthermore, the oil transfer operation is performed for the (i+1)-th wind turbine blade 2 after completion of the oil transfer operation for the i-th wind turbine blade 2, and thus it is possible to reliably reduce aerodynamic torque that is generated in the wind turbine rotor 4 during warm-up of the pitch hydraulic system 20.

In a case where the valves include the proportional control valve 25 and the emergency solenoid valve 31 as shown in FIG. 3, the control device 100 may be configured to control the proportional control valve 25 to open so as to change the pitch angle from the feather side toward the fine side, and then control the emergency solenoid valve 31 to open so as to return the proportional control valve from the fine side to the feather side, when making the hydraulic actuators 12 perform the oil transfer operation for the respective wind turbine blades 2.

In other words, in the oil transfer operation, the pitch angle is changed from the feather side to the fine side, and then returned from the fine side to the feather side. When the pitch angle is controlled to the fine side, the proportional control valve 25 corresponding to the subject wind turbine blade 2 is controlled to open to the fine side, thereby supplying control oil to the fine-side hydraulic chamber 123 through the control oil lines 40, 44, and discharging control oil from the feather-side hydraulic chamber 124 through the control oil lines 43, 42. Furthermore, when the pitch angle is controlled to the feather side, the proportional control valve 25 is controlled to open to the feather side, thereby supplying control oil to the fine-side hydraulic chamber 123 and the feather-side hydraulic chamber 124 through the control oil lines 40, 43, 44, and discharging control oil from the feather-side hydraulic chamber 124 through the control oil lines 46, 48, 42.

With the above configuration, in the oil transfer operation for each of the wind turbine blades 2, control oil flows through the hydraulic line (control oil line) including the proportional control valve 25, of the pitch hydraulic system 20, when changing the pitch angle to the fine side, and the control oil flows through the hydraulic line including the emergency solenoid valve 31 (control oil line and pilot oil line), of the pitch hydraulic system 20, when changing the pitch angle to the feather side. Accordingly, control oil flows through the hydraulic line in a broad range of the pitch hydraulic system 20, which makes it possible to equalize the oil temperature of control oil in the pitch hydraulic system 20 effectively, and to perform warm-up of the pitch hydraulic system 20 appropriately.

As shown in FIG. 3, in a case where the first heater 22 for heating control oil inside the first tank 21 is provided, the control device 100 may be configured to, when the first hydraulic pump 23 is stopped at the start of warm-up of the pitch hydraulic system 20 and the temperature of control oil inside the first tank 21 is not higher than a predetermined temperature that is lower than a first threshold, control the first heater 22 to heat control oil in the first tank 21 while the first hydraulic pump 23 is maintained to be stopped. It should be noted that the first heater 22 may not necessarily be provided. In that case, control oil is heated through thermal loss and friction heat of the first hydraulic pump 23 due to unload operation.

In the above configuration, when the first hydraulic pump 23 is stopped at the start of warm-up of the pitch hydraulic system 20 and the temperature of control oil inside the first tank 21 is not higher than a predetermined temperature that is lower than a first threshold, the first heater 22 increases the temperature of control oil in the first tank 21 while the first hydraulic pump 23 is maintained to be stopped. Accordingly, in a case where the viscosity or behavior of control oil is not in an assumed range due to a low temperature, the first heater 22 increases the temperature of the control oil instead of immediately operating the first hydraulic pump 23, which makes it possible to prevent damage to the first hydraulic pump 23.

Furthermore, the pitch hydraulic system 20 may further include a bypass line 41 for returning control oil from the first hydraulic pump 23 to the first tank 21, having an end connected to a section between the first hydraulic pump 23 and the hydraulic actuator 12, and a bypass valve 24 disposed in the bypass line 41.

In this case, when the temperature of control oil inside the first tank 21 is lower than the first threshold, the control device 100 opens the bypass valve 24 to circulate control oil in the first tank 21 through a circulation flow passage including the bypass line 41, with the first hydraulic pump 23, thereby achieving an unload state in which control oil is not supplied to the hydraulic actuator 12. Furthermore, the control oil pressure of the hydraulic actuator 12 may be maintained during unload operation by a check valve 35 disposed in the control oil line 40 that is closer to the proportional control valve 25 than the bypass line 41. Hereinafter, unload operation refers to operation in which the hydraulic pump 23 is driven in an unload state, and control oil is circulated in the circulation flow passage including the bypass line 41, in warm-up operation.

Furthermore, when the temperature of control oil inside the first tank 21 is not lower than the first threshold, the control device 100 is configured to close the bypass valve 24 and achieve an on-load state in which control oil can be supplied to the hydraulic actuator 12. Hereinafter, on-load operation refers to operation in which the hydraulic pump 23 is driven in an on-load state, and control oil is supplied to the hydraulic actuator 12 in warm-up operation.

With the above configuration, the state of the pitch hydraulic system 20 is switched between the unload state and the on-load state in response to the temperature of control oil inside the first tank 21, through the opening-closing control of the bypass valve 24, and thus it is possible to perform warm-up of the pitch hydraulic system 20 efficiently.

Specifically, in a case where the temperature of control oil inside the first tank 21 is lower than the first threshold, the state of the pitch hydraulic system 20 is switched to the unload state, and control oil is circulated in the circulation flow passage including the bypass line 41 to increase the temperature of control oil inside the first tank 21. Furthermore, if the temperature of control oil inside the first tank 21 is not lower than the threshold, it is possible to equalize the oil temperature of control oil in the pitch hydraulic system 20, by supplying control oil having a relatively high temperature inside the first tank 21 to most part of the pitch hydraulic system 20 including the hydraulic actuator 12.

Furthermore, the control device 100 may be configured to control the valves so as to stop operation of the wind turbine 1 and change the pitch angle of each wind turbine blade 2 to the feather side, in the low-temperature standby state (see FIG. 2). That is, the control device 100 is configured to control the valves (e.g. the proportional control valve 25 and the emergency solenoid valve 31), if the ambient temperature is lower than the low-temperature standby starting temperature $-T_1°$ C., which is a lower limit of the operable temperature range of the wind turbine 1, continuously for a predetermined period t1, so as to stop operation of the wind turbine 1 and change the pitch angle of each of the wind turbine blades 2A to 2C to the feather side. In the low-temperature standby state, the wind turbine 1 may stand by in an unload state in which the bypass valve 24 is open.

Furthermore, the control device 100 may be configured to perform warm-up of each part of the wind turbine 1 including the pitch hydraulic system 20 in the warm-up state, after the warm-up starting condition (B) is satisfied.

With the above configuration, the wind turbine 1 stands by in an unload state in which the bypass valve 24 is open until the warm-up starting condition (B) is satisfied, and thus it is possible to circulate control oil in the circulation flow passage including the bypass line 41 to suppress temperature reduction of control oil inside the first tank 21. Accordingly, after the warm-up starting condition (B) is satisfied, it is possible to perform warm-up of the pitch hydraulic system 20 easily.

Figure 4:
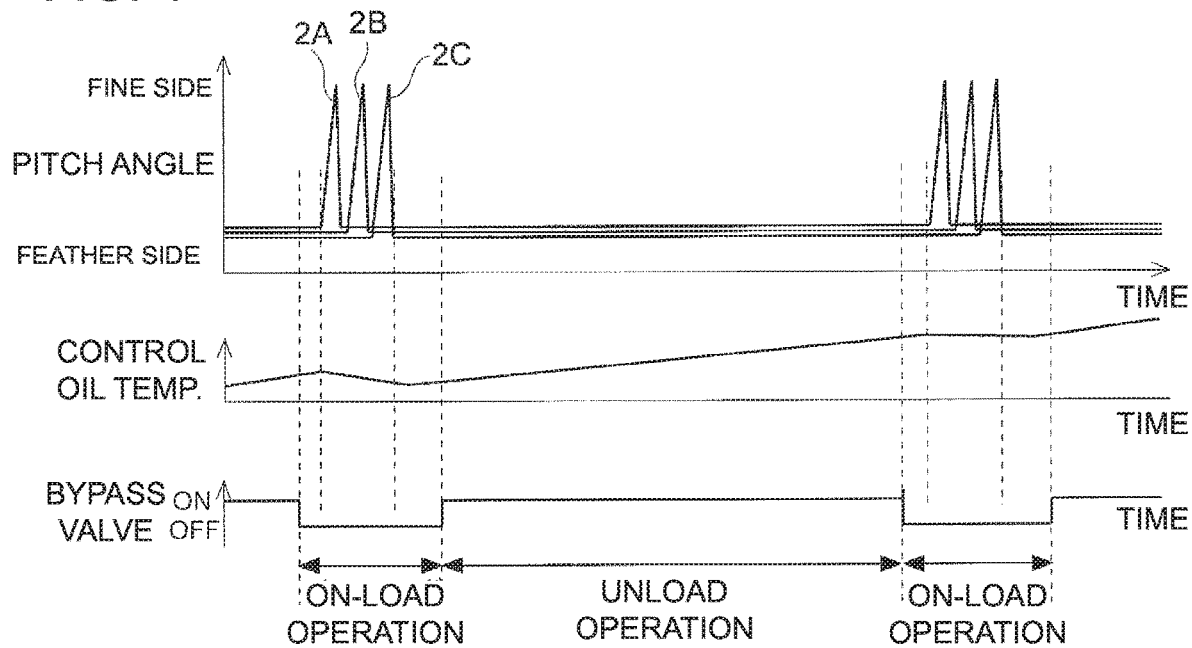
FIG. 4 is a diagram showing the pitch angle of wind turbine blades during warm-up operation.

As shown in FIG. 4, the control device 100 may be configured to perform the pitch control for the plurality of wind turbine blades 2A to 2C in turn. FIG. 4 is a diagram showing the pitch angle of the wind turbine blades 2A to 2C during warm-up operation.

As shown in the drawing, in the warm-up state, the control device 100 performs a valve control to perform oil transfer operation in which the pitch angle of the wind turbine blade 2A is firstly changed from the feather side to the fine side, and then returned to the feather side. Once the oil transfer operation of the wind turbine blade 2A is completed, the oil transfer operation is performed similarly for the next wind turbine blade 2B. Then, once the oil transfer operation of the wind turbine blade 2B is completed, the oil transfer operation is performed similarly for the wind turbine blade 2C. After completing the oil transfer operation of all of the wind turbine blades 2A to 2C, the state of the feather pitch angle is maintained, and the oil transfer operation is performed again for the wind turbine blades 2A to 2C in turn after a predetermined period.

In the warm-up state, when the oil transfer operation for the wind turbine blades 2A to 2C is not performed, the bypass valve 24 may be maintained to be open as shown in FIG. 3, and control oil heated by the first heater 22 may be circulated (unload operation). Accordingly, it is possible to increase the temperature of control oil that has been cooled in the oil transfer operation of the wind turbine blades 2A to 2C before the next oil transfer operation.

Figure 5:
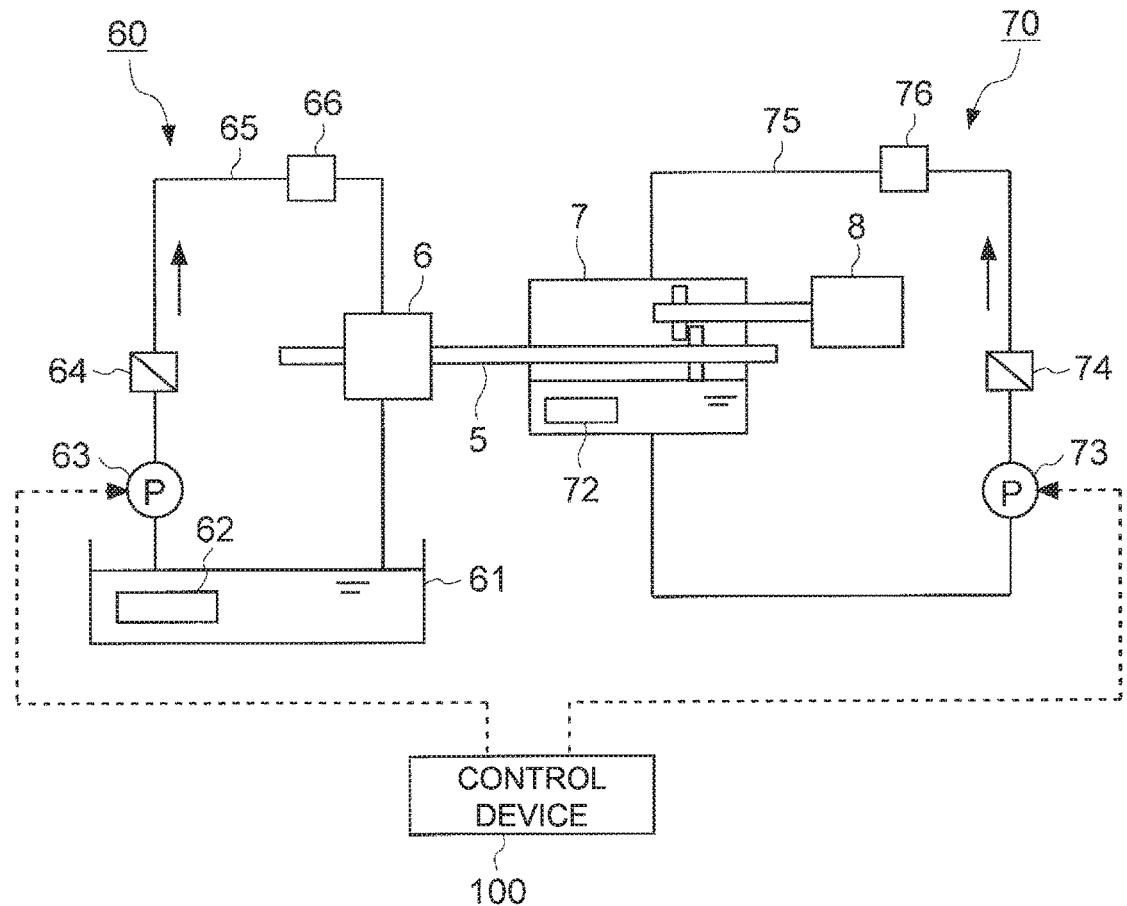
FIG. 5 is a diagram showing a main-shaft hydraulic system and a speed increasing unit hydraulic system of a wind turbine according to an embodiment.

The wind turbine 1 having the above described configuration may further include a main shaft hydraulic system 60 and a speed increasing unit hydraulic system 70, as shown in FIG. 5 as example. FIG. 5 is a diagram showing the main-shaft hydraulic system 60 and the speed increasing unit hydraulic system 70 of the wind turbine 1 according to an embodiment.

In the embodiment shown in FIG. 5, the wind turbine 1 includes the main shaft 5 configured to rotate with the wind turbine rotor 4 (see FIG. 1), the main bearing 6 rotatably supporting the main shaft 5, and the main-shaft hydraulic system 60 for supplying lubricant oil to the main bearing 6.

The main-shaft hydraulic system 60 includes a second tank 61 storing lubricant oil for the main bearing 6, a lubricant oil line 65 for supplying lubricant oil inside the second tank 61 to the main bearing 6, and a second hydraulic pump 63 disposed in the lubricant oil line 65. Furthermore, the main-shaft hydraulic system 60 may include at least one of a filter 64 disposed in the lubricant oil line 65, or a second heater 62 for heating lubricant oil inside the second tank 61. Moreover, the main-shaft hydraulic system 60 may include a cooler 66.

Furthermore, the wind turbine 1 includes the speed increasing unit 7 for increasing the rotation speed of the wind turbine rotor 4 (see FIG. 1), and the speed increasing unit hydraulic system 70 for supplying lubricant oil to the speed increasing unit 7.

The speed increasing unit hydraulic system 70 includes a tank part 71 disposed inside the speed increasing unit 7, a circulation pipe 75 connected to the tank part 71, and a third hydraulic pump 73 for circulating lubricant oil stored in the tank part 71 via the circulation pipe 75. Furthermore, the speed increasing unit hydraulic system 70 may include at least one of a filter 74 disposed in the circulation pipe 75, or a third heater 72 for heating lubricant oil inside the tank part 71. Moreover, the speed increasing unit hydraulic system 70 may include a cooler 76.

In this case, the control device 100 is configured to, in the warm-up state of each part of the wind turbine 1, continue operation of the pump which is in operation when the warm-up starting condition is satisfied, from among the first hydraulic pump 23 (see FIG. 3), the second hydraulic pump 63, and the third hydraulic pump 73 (see FIG. 5).

Accordingly, in warm-up of each part of the wind turbine, operation of the pump which is in operation when the warm-up starting condition is satisfied is continued without a break, and thus warm-up can be performed immediately.

Furthermore, the control device 100 may be configured to, if the temperature of the lubricant oil inside the second tank 61 is lower than a second threshold after the warm-up starting condition (B) is satisfied, control the second heater 62 to heat the lubricant oil inside the second tank 61, and once the temperature of the lubricant oil inside the second tank 61 reaches the second threshold, operate the second hydraulic pump 63 intermittently.

With the above configuration, after the warm-up starting condition (B) is satisfied, the second heater 62 performs heating until the temperature of lubricant oil inside the second tank 61 (lubricant oil for the main bearing) reaches the second threshold. Accordingly, for instance, in a case where the viscosity or behavior of lubricant oil is not within an assumed range due to a low temperature, the second heater 62 increases the temperature of the lubricant oil instead of immediately operating the second hydraulic pump 63, which makes it possible to prevent damage to the second hydraulic pump 63, and suppress leakage of high-viscosity lubricant oil from the main bearing 6. Furthermore, after the temperature of lubricant oil inside the second tank 61 reaches the second threshold, the second hydraulic pump 63 is operated intermittently (inching operation), and thus it is possible to suppress leakage of high-viscosity lubricant oil from the main bearing 6. Accordingly, it is possible to perform warm-up of the main shaft hydraulic system 60 appropriately.

The control device 100 may be configured to control the third heater 72 so as to heat lubricant oil inside the tank part 71 or the circulation pipe 75 for a predetermined time after satisfying the warm-up starting condition (B).

In the speed increasing unit hydraulic system 70, similarly to the above described main shaft hydraulic system 60, the inching operation may be performed to operate the third hydraulic pump 73 intermittently in the warm-up state.

With the above configuration, after the warm-up starting condition is satisfied, the third heater 72 increases the temperature of lubricant oil (lubricant oil for speed increasing unit) inside the tank part 71 or the circulation pipe 75, and thereby it is possible to perform warm-up of the speed increasing unit hydraulic system 70 appropriately.

In an embodiment, in a case where the wind turbine 1 is provided with the yaw drive part 14 as shown in FIG. 1, the yaw drive part 14 may be controlled to rotate the nacelle 9 so as to follow wind direction during operation of the wind turbine 1, while the yaw drive part 14 does not make the nacelle 9 turn to the wind direction when the wind turbine 1 stands by in the unload state as described above.

In this way, the yaw drive part 14 makes the nacelle 9 turn to the wind direction during operation of the wind turbine 1 to improve the operation efficiency of the wind turbine 1, and the yaw drive part 14 does not make the nacelle 9 turn to the wind direction during standby of the wind turbine in the unload state. Thus, it is possible to save energy.

Next, with reference to FIG. 6, a control method for the wind turbine 1 according to some embodiments will be described. The configuration of the wind turbine 1 for applying the following method is described above, and will not be described again. In the following description, respective parts of the wind turbine 1 are associated with reference numerals shown in FIGS. 1, 3, and 5.

A method of controlling the wind turbine 1 according to some embodiments includes a step of controlling a valve (e.g. proportional control valve 2 or emergency solenoid valve 31) corresponding to each of the wind turbine blades 2, during warm-up of the pitch hydraulic system 20 of the plurality of wind turbine blades 2 (2A to 2C), for each of the plurality of wind turbine blades 2 in turn, such that the hydraulic actuator 12 (12A to 12C) corresponding to the wind turbine blade 2 performs oil transfer operation in which the pitch angle of the wind turbine blade 2 is moved to the fine side from the feather side and returned again to the feather side.

Furthermore, in the step of controlling a valve, a plurality of valves (e.g. the proportional control valve 25 or the emergency solenoid valve 31 shown in FIG. 3) may be controlled such that the i-th hydraulic actuator 12 (where i=1 to N−i, and N is the total number of wind turbine blades 2A to 2C) performs the oil transfer operation for the i-th wind turbine blade 2 and then the (i+1)-th hydraulic actuator 12 of the wind turbine blade 2 performs the oil transfer operation for the (i+1)-th wind turbine blade 2.

Furthermore, the above step of controlling the valves may include, when making the hydraulic actuators 12 perform the oil transfer operation for the respective wind turbine blades 2, controlling the proportional control valve 25 to open so as to change the pitch angle from the feather side toward the fine side, and then controlling the emergency solenoid valve 31 to open so as to return the proportional control valve from the fine side to the feather side.

Furthermore, the method of controlling the wind turbine 1 may include a step of controlling the valves to stop operation of the wind turbine 1 and changing the pitch angle of each of the wind turbine blades 2 to the feather side if the ambient temperature is not higher than the low-temperature standby starting temperature $T_1$, which is a lower limit of the operable temperature range of the wind turbine 1, continuously for a predetermined period t, a step of making the wind turbine 1 stand by in an unload state in which the bypass valve 24 is open until the warm-up starting condition in which the ambient temperature is not lower than the warm-up starting temperature $T_2$ continuously for a predetermined period t2 is satisfied, and a step of performing warm-up of each part of the wind turbine 1 including the pitch hydraulic system 20 after the warm-up starting condition (B) is satisfied.

With reference to FIG. 3, the method of controlling the wind turbine 1 shown in FIG. 6 will be described.

As shown in FIG. 6, once the warm-up starting condition (B) is satisfied and warm-up operation is started, unload operation is performed for the pitch hydraulic system 20, if the temperature of control oil inside the first tank 21 is lower than the first threshold. In the unload operation, in an unload state in which the bypass valve 24 is open, the temperature of control oil is increased by the first heater 22, or by control oil in the first tank 21 being circulated by the first hydraulic pump 23 through the circulation flow passage including the bypass line 41 (S1). If the temperature of control oil is not lower than the first threshold, the unload operation may not necessarily be performed.

Once the temperature of control oil is increased, the bypass valve 24 is closed and on-load operation is performed. In the on-load operation, the first hydraulic pump 23 is driven in an on-load state in which the bypass valve 24 is closed, and the pitch warm-up operation is performed for each blade (S2). Once the pitch warm-up operation is completed for all of the wind turbine blades 2, the bypass valve 24 is opened and the unload operation is performed again to circulate control oil, thus increasing the temperature of the control oil (S3). After circulating the control oil for a set period of time, the bypass valve 24 is closed to achieve an on-load state, and pitch warm-up operation is performed for each wind turbine blade 2 by the pitch hydraulic system 20 (S2). Accordingly, steps S2 and S3 are repeated. Once warm-up of other systems is completed and the ambient temperature satisfies the warm-up completing condition (C), the wind turbine 1 transitions to the operation state (including the standby state, the start-up state).

As described above, according to some embodiments of the present invention, the hydraulic actuators 12 (12A to 12C) perform the oil transfer operation for the plurality of wind turbine blades 2 (2A to 2C), and control oil is moved through the pitch hydraulic system 20 of each of the wind turbine blades 2 (2A to 2C), and thereby it is possible to equalize the oil temperature of control oil, and perform warm-up of the pitch hydraulic system 20 appropriately. Furthermore, the oil transfer operation is performed for the plurality of wind turbine blades 2 (2A to 2C) in turn, and thus it is possible to reduce aerodynamic torque that is generated in the wind turbine rotor 4 during warm-up of the pitch hydraulic system 20, and thus to suppress unintended rotation of the wind turbine rotor 4.

Embodiments of the present invention were described in detail above, but the present invention is not limited thereto, and various amendments and modifications may be implemented.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

DESCRIPTION OF REFERENCE NUMERALS

1 Wind turbine
2, 2A to 2C Wind turbine blade
3 Hub
4 Wind turbine rotor
5 Main shaft
6 Main bearing
7 Speed increasing unit
8 Generator
9 Nacelle
10 Tower
12, 12A to 12C Hydraulic actuator
14 Yaw drive part
20 Pitch hydraulic system
21 First tank
22 First heater
23 First hydraulic pump
24 Bypass valve
25 proportional control valve
26, 27, 32 Check valve
28, 29 Opening-closing valve
30 Accumulator
31 Emergency solenoid valve
40, 42 to 44, 46, 48 Control oil line
41 Bypass line
50 Pilot oil line
60 Main-shaft hydraulic system
61 Second tank
62 Second heater
63 Second hydraulic pump
65 Lubricant oil line
70 Speed increasing unit hydraulic system
71 Tank part
72 Third heater
73 Third hydraulic pump
75 Circulation pipe
100 Control device
121 Hydraulic cylinder
122 Cylinder rod
123 Fine-side hydraulic chamber
124 Feather-side hydraulic chamber
A Fine-side port
B Feather-side port

The invention claimed is:

1. A wind turbine, comprising:
   a plurality of wind turbine blades;
   a plurality of hydraulic actuators for controlling respective pitch angles of the plurality of wind turbine blades;
   a first tank storing control oil for the plurality of hydraulic actuators;
   a first hydraulic pump disposed between each of the plurality of hydraulic actuators and the first tank, for pumping the control oil;
   a plurality of valves which is provided for the plurality of hydraulic actuators, for controlling a supply state of the control oil to the plurality of hydraulic actuators, respectively; and
   a control part for controlling each of the plurality of valves,
   wherein the control part is configured to, in warm-up of a pitch hydraulic system of the plurality of wind turbine blades, for each of the plurality of wind turbine blades in turn, control one of the plurality of valves corresponding to said each of the plurality of wind turbine blades so as to make one of the plurality of hydraulic actuators corresponding to said each of the plurality of wind turbine blades perform an oil transfer operation of changing the pitch angle of said each of the plurality of wind turbine blades from a feather side toward a fine side and then returning the pitch angle to the feather side.

2. The wind turbine according to claim 1,
wherein the control part is configured to control the plurality of valves so as to make an i-th hydraulic actuator, among the plurality of hydraulic actuators, perform the oil transfer operation for an i-th wind turbine blade, among the plurality of wind turbine blades (where i=1 to N-1 and N is the total number of the plurality of wind turbine blades), and then make an (i+1)-th hydraulic actuator, among the plurality of hydraulic actuators, perform the oil transfer operation for an (i+1)-th wind turbine blade, among the plurality of wind turbine blades.

3. The wind turbine according to claim 1,
wherein the plurality of valves includes:
a proportional control valve disposed between each of the plurality of hydraulic actuators and the first hydraulic pump; and
an emergency solenoid valve disposed between each of the plurality of hydraulic actuators and the first tank, and
wherein the control part is configured to, when making one of the plurality of hydraulic actuators of each of the plurality of wind turbine blades perform the oil transfer operation, control the proportional control valve to open so as to change the pitch angle from the feather side toward the fine side, and then control the emergency solenoid valve to open so as to return the pitch angle from the fine side toward the feather side.

4. The wind turbine according to claim 1, further comprising:
a bypass line having an end connected between the first hydraulic pump and each of the plurality of hydraulic actuators, for returning the control oil from the first hydraulic pump to the first tank; and
a bypass valve disposed in the bypass line,
wherein the control part is configured to:
if a temperature of the control oil in the first tank is lower than a first threshold, open the bypass valve to make the first hydraulic pump circulate the control oil in the first tank through a circulation flow passage including the bypass line, to achieve an unload state in which the control oil is not supplied to the plurality of hydraulic actuators; and
if the temperature of the control oil inside the first tank is not lower than the first threshold, close the bypass valve to achieve an on-load state in which the control oil is suppliable to the plurality of hydraulic actuators.

5. The wind turbine according to claim 4, further comprising a first heater for heating the control oil in the first tank,
wherein the control part is configured to, if the first hydraulic pump is stopped at start of warm-up of the pitch hydraulic system and the temperature of the control oil in the first tank is not higher than a predetermined temperature which is lower than the first threshold, control the first heater to heat the control oil in the first tank while the first hydraulic pump is maintained to be stopped.

6. The wind turbine according to claim 1, further comprising:
a bypass line having an end connected between the first hydraulic pump and each of the plurality of hydraulic actuators, for returning the control oil from the first hydraulic pump to the first tank; and
a bypass valve disposed in the bypass line,
wherein the control part is configured to:
if an ambient temperature is lower than a lower limit of an operable temperature range of the wind turbine continuously for a predetermined period, control the plurality of valves to stop operation of the wind turbine and change the pitch angle of each of the plurality of wind turbine blades to the feather side;
make the wind turbine stand by in an unload state in which the bypass valve is open, until a warm-up starting condition such that the ambient temperature is not lower than a warm-up starting temperature of the wind turbine continuously for a predetermined period is satisfied; and
after the warm-up starting condition is satisfied, perform warm-up of each part of the wind turbine including the pitch hydraulic system.

7. The wind turbine according to claim 6, further comprising:
a main shaft configured to rotate with a wind turbine rotor including the plurality of wind turbine blades;
a main bearing supporting the main shaft rotatably;
a second tank storing lubricant oil for the main bearing;
a second heater for heating the lubricant oil in the second tank; and
a second hydraulic pump for supplying the main bearing with the lubricant oil in the second tank,
wherein the control part is configured to, after the warm-up starting condition is satisfied:
if a temperature of the lubricant oil in the second tank is lower than a second threshold, control the second heater to heat the lubricant oil in the second tank; and
if the temperature of the lubricant oil in the second tank reaches the second threshold, operate the second hydraulic pump intermittently.

8. The wind turbine according to claim 6, further comprising:
a speed increasing gear for increasing a rotation speed of a wind turbine rotor including the plurality of wind turbine blades;
a third hydraulic pump for circulating lubricant oil stored in a tank part disposed inside the speed increasing gear, via a circulation pipe connected to the tank part; and
a third heater for heating the lubricant oil in the tank part or the circulation pipe,
wherein the control part is configured to, after the warm-up starting condition is satisfied, control the third heater to heat the lubricant oil in the tank part or the circulation pipe for a predetermined time.

9. The wind turbine according to claim 6, further comprising:
a main shaft configured to rotate with a wind turbine rotor including the plurality of wind turbine blades;
a main bearing supporting the main shaft rotatably;
a second tank storing lubricant oil for the main bearing;
a second hydraulic pump for supplying the main bearing with the lubricant oil in the second tank;

a speed increasing gear for increasing a rotation speed of the wind turbine rotor; and a third hydraulic pump for circulating lubricant oil stored in a tank part disposed inside the speed increasing gear, via a circulation pipe connected to the tank part, wherein the control part is configured to, in warm-up of each part of the wind turbine, continue operation of the pump which is in operation when the warm-up starting condition is satisfied, from among the first hydraulic pump, the second hydraulic pump, and the third hydraulic pump.

10. The wind turbine according to claim 6, further comprising:

a nacelle rotatably supporting a wind turbine rotor including the plurality of wind turbine blades; and a yaw drive part for rotating the nacelle, wherein the control part is configured to:

control, during operation of the wind turbine, the yaw drive part to make the nacelle rotate in a wind direction; and control, during standby of the wind turbine in the unload state, the yaw drive part not to make the nacelle rotate in the wind direction.

11. A control device for the wind turbine according to claim 1, configured to control, in warm-up of a pitch hydraulic system of a plurality of wind turbine blades of the wind turbine, for each of the plurality of wind turbine blades in turn, control one of the plurality of valves corresponding to said each of the plurality of wind turbine blades so as to make one of the plurality of hydraulic actuators corresponding to said each of the plurality of wind turbine blades perform an oil transfer operation of changing the pitch angle of said each of the plurality of wind turbine blades from a feather side toward a fine side and then returning the pitch angle to the feather side.

12. A method of controlling a wind turbine comprising:

a plurality of wind turbine blades;

a plurality of hydraulic actuators for controlling respective pitch angles of the plurality of wind turbine blades;

a first tank storing control oil for the plurality of hydraulic actuators;

a first hydraulic pump disposed between each of the plurality of hydraulic actuators and the first tank, for pumping the control oil; and a plurality of valves which is provided for the plurality of hydraulic actuators, for controlling a supply state of the control oil to the plurality of hydraulic actuators, respectively, the method comprising a step of, in warm-up of a pitch hydraulic system of the plurality of wind turbine blades, for each of the plurality of wind turbine blades in turn, controlling one of the plurality of valves corresponding to said each of the plurality of wind turbine blades so as to make one of the plurality of hydraulic actuators corresponding to said each of the plurality of wind turbine blades perform an oil transfer operation of changing the pitch angle of said each of the plurality of wind turbine blades from a feather side toward a fine side and then returning the pitch angle to the feather side.

13. The method of controlling a wind turbine according to claim 12, wherein the step of controlling one of the plurality of valves includes controlling the plurality of valves so as to make an i-th hydraulic actuator, among the plurality of hydraulic actuators, perform the oil transfer operation for an i-th wind turbine blade, among the plurality of wind turbine blades (where i=1 to N-1 and N is the total number of the plurality of wind turbine blades), and then make an (i+1)-th hydraulic actuator, among the plurality of hydraulic actuators, perform the oil transfer operation for an (i+1)-th wind turbine blade, among the plurality of wind turbine blades.

14. The method of controlling a wind turbine according to claim 12, wherein the plurality of valves includes:

a proportional control valve disposed between each of the plurality of hydraulic actuators and the first hydraulic pump; and an emergency solenoid valve disposed between each of the plurality of hydraulic actuators and the first tank, and wherein the step of controlling one of the plurality of valves includes:

when making one of the plurality of hydraulic actuators of each of the plurality of wind turbine blades perform the oil transfer operation, controlling the proportional control valve to open so as to change the pitch angle from the feather side to the fine side, and then controlling the emergency solenoid valve to open so as to return the pitch angle from the fine side to the feather side.

15. The method of controlling a wind turbine according to claim 12, wherein the wind turbine comprises:

a bypass line having an end connected between the first hydraulic pump and each of the plurality of hydraulic actuators, for returning the control oil from the first hydraulic pump to the first tank; and a bypass valve disposed in the bypass line, wherein the method further comprises:

a step of, if an ambient temperature is lower than a lower limit of an operable temperature range of the wind turbine continuously for a predetermined period, controlling the plurality of valves to stop operation of the wind turbine and change the pitch angle of each of the plurality of wind turbine blades to the feather side;

a step of making the wind turbine stand by in an unload state in which the bypass valve is open, until a warm-up starting condition such that the ambient temperature is not lower than a warm-up starting temperature of the wind turbine continuously for a predetermined period is satisfied; and a step of, after the warm-up starting condition is satisfied, performing warm-up of each part of the wind turbine including the pitch hydraulic system.

* * * * *